United States Patent
Milot (12)

(10) Patent No.: US 6,662,935 B1
(45) Date of Patent: Dec. 16, 2003

(54) PATTERN FORMING DEVICE FOR SORTED CONCRETE PRODUCTS ON A CONVEYOR

(75) Inventor: Eric Milot, Montreal (CA)

(73) Assignee: D.I.T. Equipment, Inc., St. Bruno (CA)

( * ) Notice: Subject to any disclaimer, the term of this patent is extended or adjusted under 35 U.S.C. 154(b) by 0 days.

(21) Appl. No.: 10/222,597

(22) Filed: Aug. 15, 2002

(51) Int. Cl.[7] .................. B65G 13/02; B65G 13/12; B65G 29/00; B65G 37/00; B65G 47/26
(52) U.S. Cl. ............... 198/782; 198/419.1; 198/624; 414/791.6
(58) Field of Search .................. 198/419.1, 419.2, 198/624, 782; 414/791.6, 931

(56) References Cited

U.S. PATENT DOCUMENTS 3,965,231 A * 6/1976 Depka ................ 264/161
5,054,994 A * 10/1991 Leeds et al. ............ 414/931
5,788,460 A * 8/1998 Campau ............... 414/791.6

FOREIGN PATENT DOCUMENTS

CA          2 317 329 A1    3/2002

* cited by examiner

Primary Examiner—Gene O. Crawford
(74) Attorney, Agent, or Firm—Akerman Senterfitt

(57) ABSTRACT

A device allowing concrete products sorted on a traveling conveyor to be formed in a predetermined pattern of products for subsequent feeding onto a concrete product stacking cuber. A set of pneumatic wheels located downstream of the conveyor and vertically distanced from the conveyor cooperate with a rubber lined shaft located under the wheels to contact the concrete product to act as a gate to the predetermined pattern. The wheels and the shaft are driven in synchronization to rotate in a direction as to cause the pattern of concrete products to be forwarded therebetween to the stacking cuber.

11 Claims, 4 Drawing Sheets

PATTERN FORMING DEVICE FOR SORTED CONCRETE PRODUCTS ON A CONVEYOR

FIELD OF THE INVENTION

The present invention relates to a device allowing concrete products sorted or a travelling conveyor to be formed in a predetermined pattern of concrete products for subsequent feeding onto a concrete product stacking cuber.

BACKGROUND OF THE INVENTION

In Tumbled products semi-automatic handling and cubing systems, concrete products dispensed from a tumbler and dropped onto a product receiving belt to be subsequently received in a chaotic state on a travelling conveyor. It is necessary to manually arrange the products on this conveyor so that they may be thereafter stacked in the form of a cube on a wooden pallet. On example of a device for sorting and arranging concrete products, such bricks, pavement stones, walls stones or the like may be found described in applicant's Canadian application No. 2,317,329 filed Sep. 5, 2000 and published Mar. 5 2002. The handling system described in this publication comprises a first conveyor of low speed on which are placed products dispensed from a Tumbler and at least one additional conveyor having a speed higher than that of the first conveyor and located near the first conveyor to thus allow a proper arrangement of products for stacking.

Another system requires a gate or blocker to separate each pattern formed and one or two pushing devices to drive one pattern to a cuber steel plate. They also require two independently driven conveyors (before and after the gate).

In another system, the products are sorted on a non-moving section (conveyor or steel plate) and pushed by hand to a moving conveyor.

STATEMENT OF THE INVENTION

The present invention is concerned with providing a device for gating concrete products which are manually sorted on a travelling conveyor and formed in a predetermined pattern so that the concrete products may be subsequently fed onto a concrete product stacking cuber.

Hence, an object of the present invention is to combine the gate and product pushing device in a single and compact apparatus.

This is achieved by providing a device of the type just described which comprises essentially:

a) a set of wheels located downstream of the conveyor and spaced above the conveyor;

b) a shaft located under the wheels; the shaft cooperating with the wheels to contact the concrete products to act as a gate to the pattern of products; and c) drive means for rotating the wheels and the shaft; the drive means being actuatable to rotate the wheels and the shaft in a direction so as to cause the pattern of concrete products to be forwarded therebetween to the stacking cuber.

In one form of the invention, detecting means are mounted over the conveyor to detect the pattern of concrete products: the drive means are actuated in response to signals received from these detecting means.

In another form of the invention, the wheels are pneumatic while the shaft is rubber lined.

In another form of the invention, the wheel and the shaft are driven in synchronization.

In another form of the invention, a second rubber shaft is mounted above to drivingly contact the wheels.

Yet, in a further form of the invention. the wheels and the second rubber shaft are vertically adjustable relative to the conveyor conform with variable thicknesses of concrete products to be sorted.

Other objects and further scope of applicability of the present invention will become apparent from the detailed description given hereinafter. It should be understood, however, that this detailed description, while Indicating preferred embodiments of the invention, is given by way of illustration only, since various changes and modifications within the spirit and scope of the invention will become apparent to those skilled in the art.

DESCRIPTION OF PREFERRED EMBODIMENTS

Figure 1:
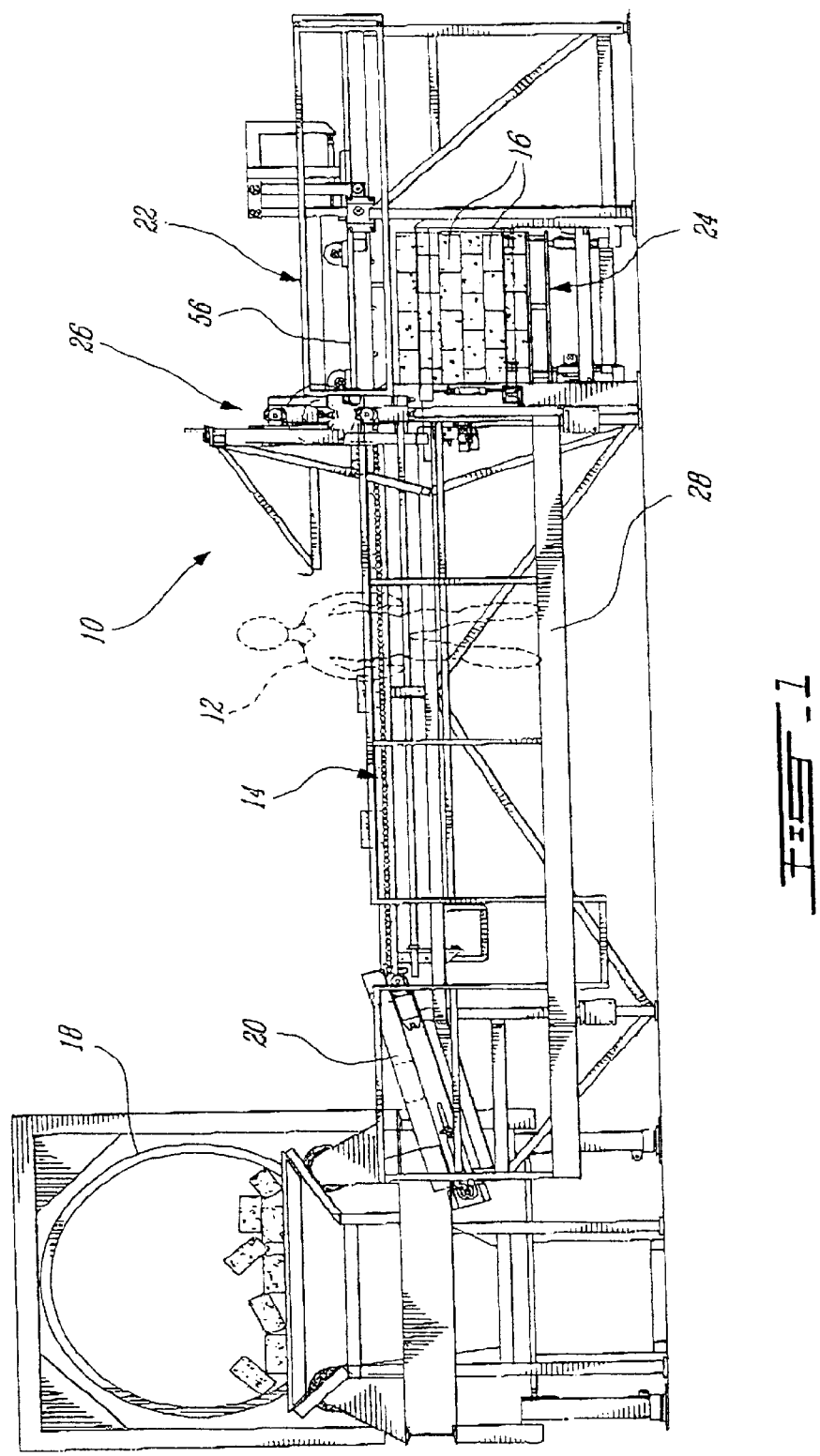
FIG. 1 is a side elevational view of a concrete sorting station incorporating the present invention.

Referring to FIG. 1, there is shown a concrete product sorting station, generally denoted 10. wherein one or two persons 12 manually sort, on a conveyor 14, a series of concrete products 16. These products have previously been tumbled in a tumbler 18 and Deposited on a product receiving belt 20 prior to being horizontally displaced on the conveyor 14. As can be seen on the right side of FIG. 1, the purpose of this station is to bring these products 16 to a concrete product cuber 22 where they are stacked in a cubic shape on a pallet 24 from which they are removed when the stack has reached a predetermined height.

The present invention is concerned with a device, generally denoted 26, which acts as a gate so that a predetermined pattern of concrete products may be formed. The pattern is predetermined in accordance with the laying of these products on the pallet.

The sorters 12 stand on one or two frames 28 associated with the conveyor frame 30.

Figure 2:
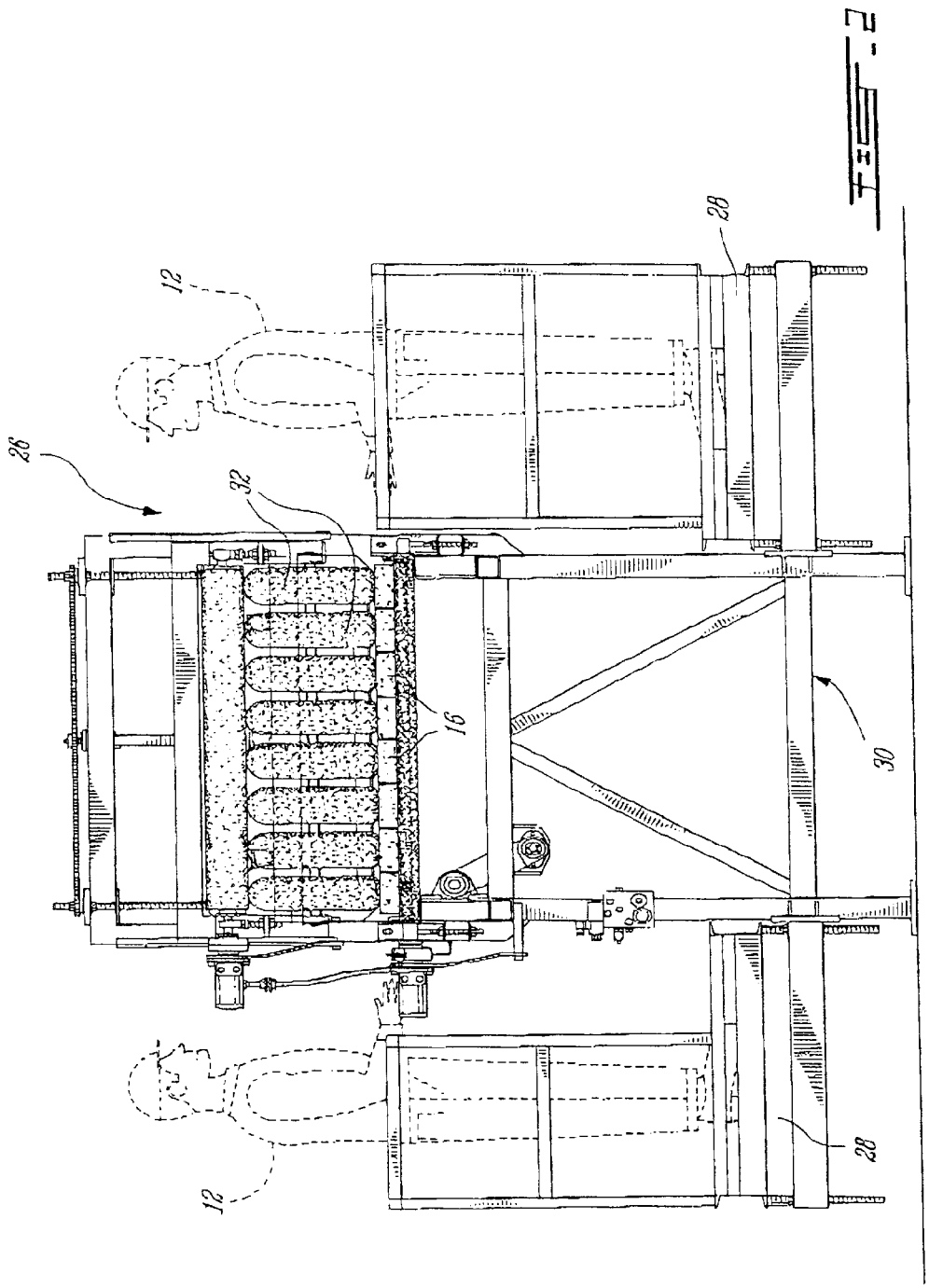
FIG. 2 is an end view as seen from the right of FIG. 1 Without the stacking cuber.
Figure 3:
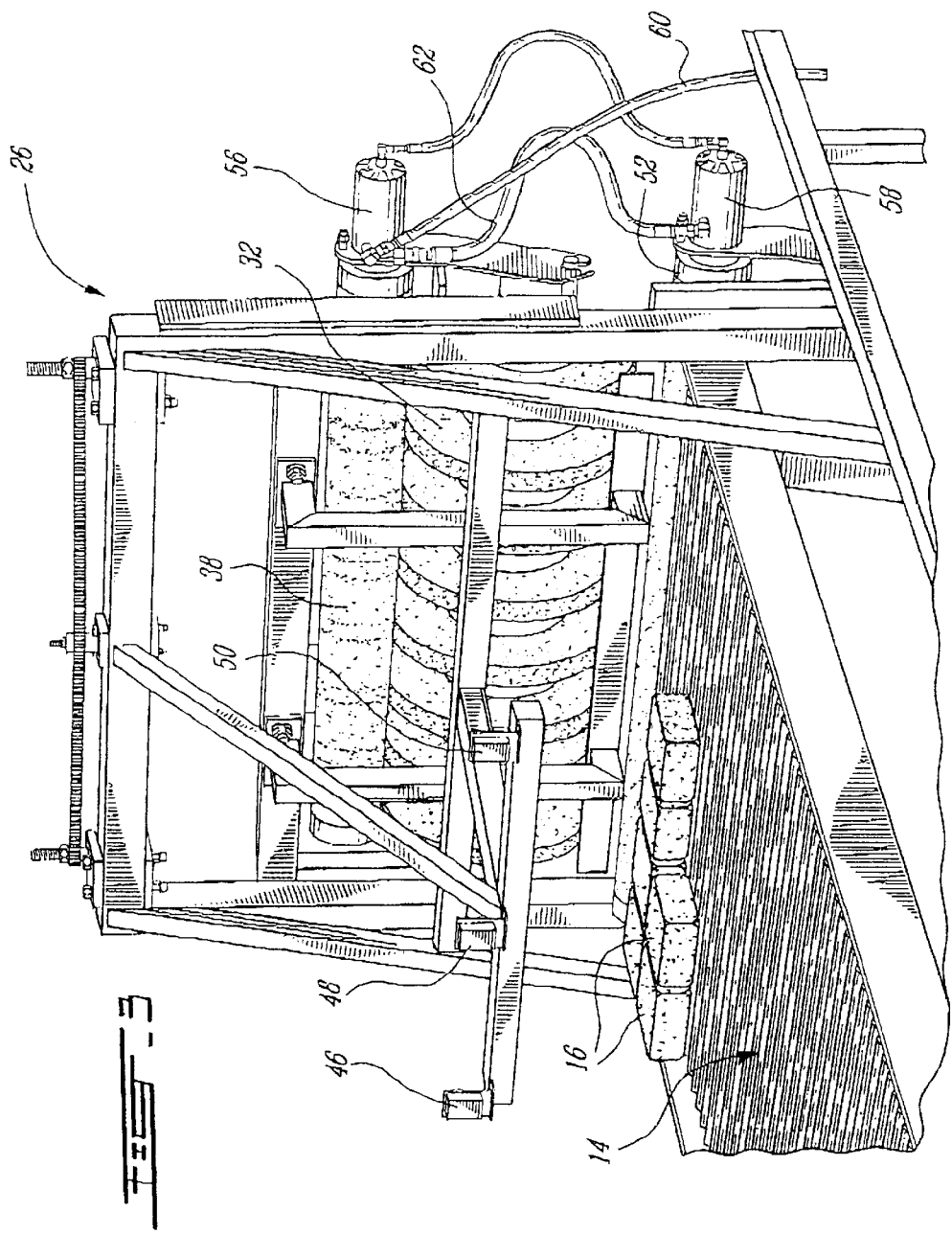
FIG. 3 is a perspective view showing the indexing device of the present invention.
Figure 4:
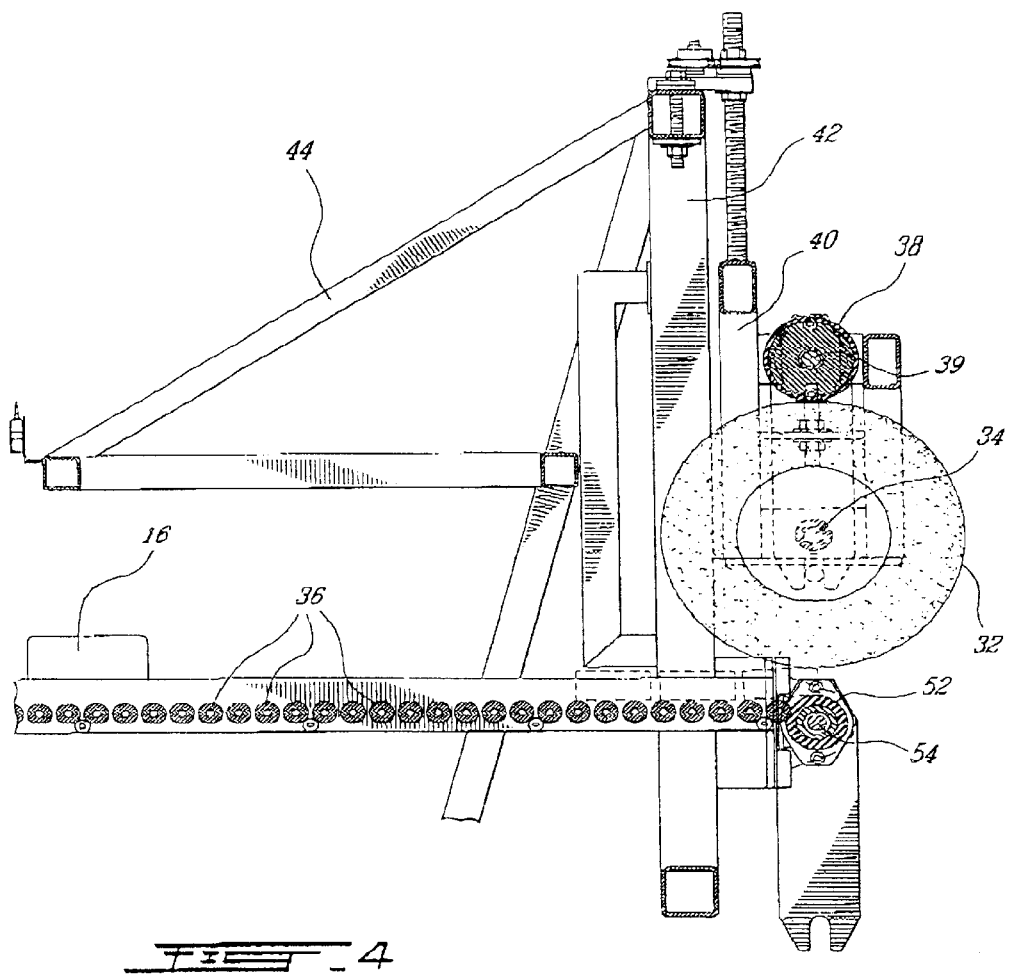
FIG. 4 is an enlarged side elevational view of the indexing device.

Referring more particularly to FIGS. 2 and 3, the device 26 comprises a set of laterally spared pneumatic wheels 32 mounted on a common axis 34 and located downstream of the conveyor 14. As can be seen in FIG. 4. The conveyor 14 is consists of a series of longitudinally spaced driven rollers 36. Such conveyor is well known in the art and a detailed description thereof is not deemed necessary.

Extending parallel and over the set of pneumatic wheels 32, is a rubber-lined shaft 38 which tangentially contact the pneumatic wheels. The shaft 38 is mounted to rotate about an axis 39 parallel to axis 34.

The set of pneumatic wheels and the shaft 38 are mounted onto a frame portion 40 (see FIG. 4) which is vertically and adjustably mounted To a main support frame 42. The latter has a frame extension 44 extending above the conveyor 14 and serving to support a series of detectors (three being shown as 46, 48 and 50) above the conveyor 14, the function of which will be described further hereinbelow.

A further rubber lined shaft 52, having an axis 54, extends in a common vertical plane Stat includes axes 34 and 39 of The wheels and the shaft 38, respectively.

Drive means 56 and 58 in the form of hydraulic motors are interconnected by means of fluid lines 60 and 62 to ensure the synchronization of shafts 34 and 39, the latter allowing the rotation of the pneumatic wheels 32 about its axis 34 as a result of its tangential contact with the wheels.

The distance between the pneumatic wheels 32 and the shaft 52 is slightly less than the height of a concrete product 16 so that, as the concrete products are manually positioned on the conveyor to form a given pattern for this cuber (such as that illustrated in FIG. 3), they act as a gate until such time as detectors 46. 48 and 50 have recognized the given pattern. Thereafter, shafts 39 and 54 are driven (and consequently the pneumatic wheels) to allow the passage of the pattern of concrete products to be moved onto a metallic plate 56 of the cubing station 22. The concrete products 16 (as shown in FIG. 2) compress the rotating pneumatic wheels as they move to the cubing station.

Should the concrete products to be tumbled and sorted have another thickness, frame 40 may be vertically adjusted on frame 42 to provide the proper distance between the shaft 52 and the wheels 32.

Although the invention has been describe above with respect to one specific form, it will be evident to a person skilled in the art that it may be modified and refined in various ways. For example, instead of using pneumatic wheels, wheels having a given compressibility and resiliency may be used, when rotated, to allow the sorted products to move onto the stacking cuber. Also, a shaft having a surface comparable to rubber may be used to cooperate with the wheels to propel the concrete products. It is therefore wished to have it understood that the present invention should not be limited in scope, except by the terms of the following claims.

What is claimed is:

1. A device allowing concrete products sorted on a travelling conveyor to be formed in a predetermined pattern of concrete products for subsequent feeding onto a concrete product stacking cuber, comprising:
    a) a set of wheels located downstream of said conveyor and spaced above said conveyor;
    b) a shaft located under said wheels; said shaft cooperating with said wheels to contact said concrete products to act as a gate to said pattern of products, and
    c) drive means for rotating said wheels and said shaft; said drive means being actuatable to rotate said wheels and said shaft in a direction so as to cause said pattern of concrete products to the forwarded therebetween to said stacking cuber.

2. A device as defined in claim 1, wherein said wheels are pneumatic.

3. A device as defined in claim 1, wherein said shaft is rubber lined.

4. A device as defined in claim 1, wherein said wheels and said shaft are driven in synchronization.

5. A device as defined in claim 1, further comprising means disposed over said conveyor detecting said pattern of concrete products on said conveyor adjacent said wheels; said drive means being actuated in response to signals received from said detecting means.

6. A device as defined in claim 5, wherein said conveyor consists of a series of longitudinally spaced rollers.

7. A device as defined in claim 1, further comprising a frame for supporting said wheels.

8. A device as defined in claim 7, further comprising a second shaft mounted on said frame above and contacting said wheels; said drive means being connected to said second shaft for rotating said second shaft and said wheels.

9. A device as defined in claim 8, wherein said frame includes a frame portion extending over said conveyor; said detecting means being mounted on said frame portion.

10. A device as defined in claim 8, wherein said wheels and said second shaft are on a second frame portion vertically adjustable relative to said conveyor to conform with variable thicknesses of concrete products travelling on said conveyor.

11. A device allowing concrete products sorted on a travelling conveyor to be formed in a predetermined pattern of concrete products for subsequent feeding onto a concrete product stacking cuber, comprising:
    a) a set of pneumatic wheels located downstream of said conveyor and spaced above said conveyor;
    b) a rubber lined shaft located under said wheels; said shaft cooperating with said wheels to contact said concrete products to act as a gate to the said pattern of products; and
    c) drive means for rotating said wheels and said shaft in synchronization; said drive means being actuatable to rotate said wheels and said shaft in a direction as to cause said pattern of concrete products to be forwarded therebetween to said stacking cuber.

* * * * *